US010642345B2

(12) United States Patent
Godina et al.

(10) Patent No.: US 10,642,345 B2
(45) Date of Patent: May 5, 2020

(54) AVIONICS MAINTENANCE TRAINING

(71) Applicant: Raytheon Company, Waltham, MA (US)

(72) Inventors: Chad L. Godina, Elkhart, IN (US); Steven S. Montgomery, Indianapolis, IN (US); Scott E. Crawford, Prosper, TX (US); Dean Allen Hoover, Noblesville, IN (US)

(73) Assignee: Raytheon Company, Waltham, MA (US)

( * ) Notice: Subject to any disclaimer, the term of this patent is extended or adjusted under 35 U.S.C. 154(b) by 94 days.

(21) Appl. No.: 15/786,234

(22) Filed: Oct. 17, 2017

(65) Prior Publication Data

US 2019/0025905 A1 Jan. 24, 2019

Related U.S. Application Data

(60) Provisional application No. 62/409,787, filed on Oct. 18, 2016.

(51) Int. Cl.

| | |
|---|---|
| ***G06F 3/01*** | (2006.01) |
| ***G06T 15/20*** | (2011.01) |
| ***G06F 3/0482*** | (2013.01) |
| ***G06T 19/00*** | (2011.01) |
| ***G09B 5/06*** | (2006.01) |
| ***G06F 3/0488*** | (2013.01) |
| ***G05B 17/00*** | (2006.01) |

(52) U.S. Cl.

CPC .............. *G06F 3/011* (2013.01); *G05B 17/00* (2013.01); *G06F 3/0482* (2013.01); *G06F 3/0488* (2013.01); *G06F 3/04883* (2013.01); *G06T 15/20* (2013.01); *G06T 19/006* (2013.01); *G09B 5/06* (2013.01); *G09B 5/065* (2013.01); *G06F 2203/04803* (2013.01); *G06F 2203/04808* (2013.01)

(58) Field of Classification Search

CPC .... G06F 3/011; G06F 3/04883; G06F 3/0482; G06F 2203/04803; G06F 2203/04808; G09B 5/06; G06T 15/20; G06T 19/006

See application file for complete search history.

(56) References Cited

U.S. PATENT DOCUMENTS

| | | | | |
|---|---|---|---|---|
| 2015/0243079 A1* | 8/2015 | Cho | G02B 27/017 345/633 |
| 2016/0379413 A1* | 12/2016 | Yamamoto | G06T 19/006 345/427 |
| 2017/0061696 A1* | 3/2017 | Li | G06T 7/70 |
| 2017/0314959 A1* | 11/2017 | Chavez | B64C 13/00 |

* cited by examiner

*Primary Examiner* — Kent W Chang
*Assistant Examiner* — Andrew Lee
(74) *Attorney, Agent, or Firm* — Schwegman Lundberg & Woessner, P.A.

(57) ABSTRACT

A virtual training system includes a computing processor, a virtual reality (VR) headset and a sensor to determine a VR hand position. The processor is configured according to computing instructions in a memory device for displaying a first VR scene that includes a first VR object. A second VR scene is displayed within a visual portal in the first VR scene that includes a second VR object. A user VR hand image is displayed in at least one of the first VR scene and the second VR scene based upon the determined VR hand position.

13 Claims, 14 Drawing Sheets

1102
1104
1104
1104
1104
1104
1104
1104
1104
1104
1104

AVIONICS MAINTENANCE TRAINING

CROSS-REFERENCE TO RELATED APPLICATION

This application claims the benefit of priority to U.S. provisional patent application No. 62/409,787, filed on Oct. 18, 2016, and entitled "AVIONICS MAINTENANCE TRAINING", which is incorporated herein by reference in its entirety.

GOVERNMENT LICENSE RIGHTS

"This invention was made with government support under government contract H94003-04-D-0006 awarded by the Department of Defense. The government has certain rights in the invention."

BACKGROUND

Aircraft maintenance typically involves numerous tasks to be performed in sequence. The maintenance may require interaction with a large number controls located at different control panels inside an aircraft or outside the aircraft in a hangar, for example. Efficient performance of these tasks requires training to create mental habits and also to build muscle memory so that proper procedures are followed even when under stress conditions. Training may be time consuming and repetitious. Close monitoring of training is required to ensure thorough learning of procedures. In order to ensure aircraft availability during training and to ensure proper training often is performed using a simulated aircraft environment.

SUMMARY

In one aspect, a virtual training system includes a computing processor, a virtual reality (VR) headset to produce a VR image within a VR setting and a sensor to determine a hand position in relation to the VR headset. The processor may be configured according to computing instructions stored in a memory device, to be executed on the processor for performing a method. The method includes displaying a first VR scene within the VR setting that includes a first VR object corresponding to a first real object at a first real location. A second VR scene is displayed within a visual portal in the first VR scene within the VR setting that includes a second VR object corresponding to a second real object at a second real location. A user VR hand image is displayed in at least one of the first VR scene and the second VR scene based upon the determined hand position in relation to the VR headset.

In another aspect, a virtual training system is provided that includes a computing processor and a display screen. The processor may be configured according to computing instructions stored in a memory device, to be executed on the processor for performing a method that includes displaying a control panel image that represents a real control panel and that includes a control panel object image that corresponds to a real control panel object. User input to the display screen is received to select the control panel object image. In response to the user selection input, a picture-in-picture (PIP) image is displayed in the control panel image representing a portion of the real control panel object that is not visible in the control panel image.

In yet another aspect, a virtual training system is provided that includes a computing processor and a display screen.

The processor may be configured according to computing instructions stored in a memory device, to be executed on the processor for performing a method for displaying a control panel image that represents a real control panel and that includes a plurality of control panel object images that correspond to a real control panel objects. A plurality of navigation objects are displayed on the display screen, each navigation object corresponding to a different control panel object image and at least partially overlaying its corresponding different control panel object image. User input is received to the display screen to select a navigation object. In response to the user input, a display of a control panel object image that corresponds to the selected navigation object is modified.

DESCRIPTION OF EMBODIMENTS

Simulation System

Figure 1:
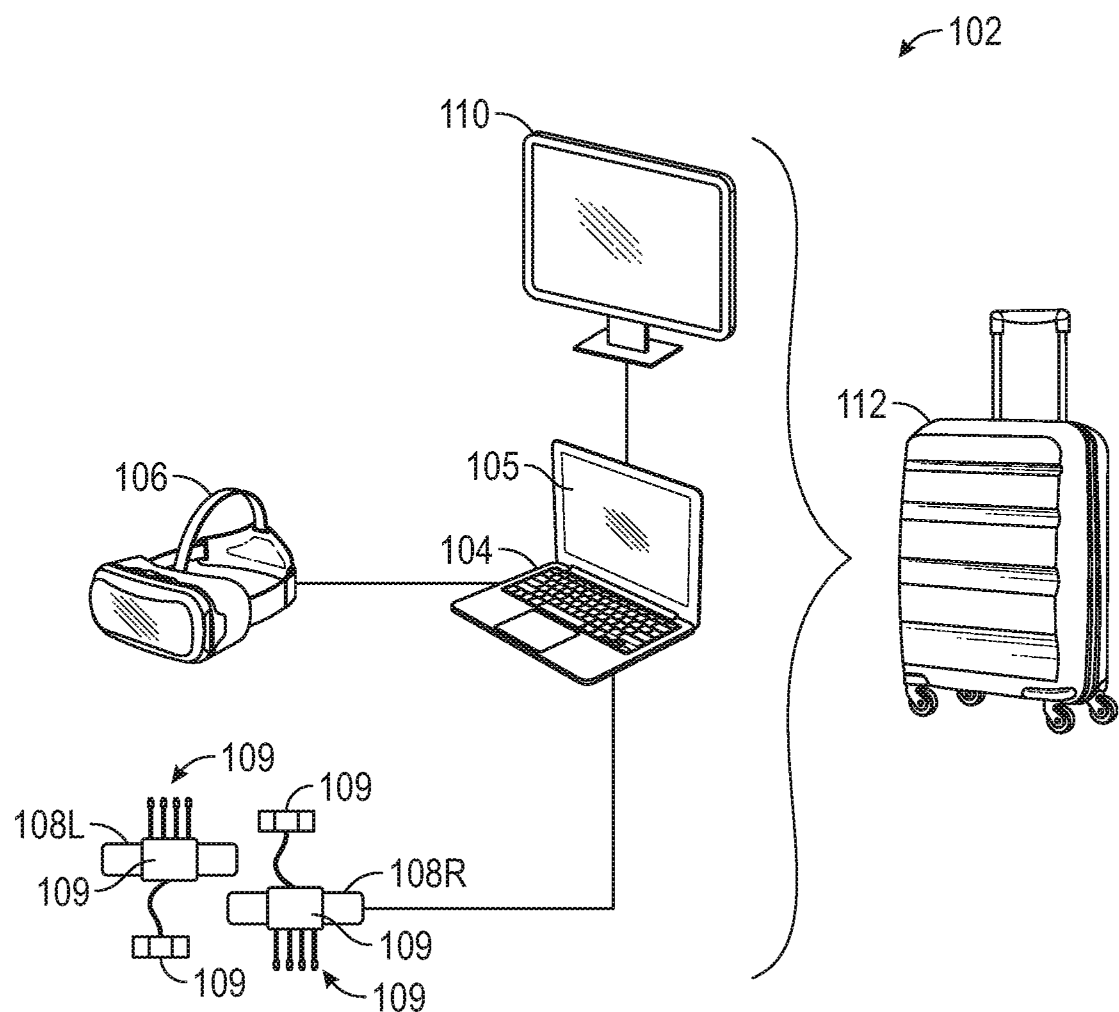
FIG. 1 is an illustrative drawing showing hardware components of a simulation system in accordance with some embodiments.

FIG. 1 is an illustrative drawing showing hardware components of a simulation system 102 in accordance with some embodiments. A computer system 104, which includes a first display screen 105, processes simulation models viewed through a head-mounted virtual reality (VR) headset 106. Certain details of the computer system 104 are described below with reference to FIG. 13. The headset 106 projects virtual images within a field of view of a user (not shown) wearing the headset 106 so that the user may view a VR scene (not shown). Hand-mounted position sensing controllers 108L, 108R that may be embedded in gloves worn on a user's left and right hands. The position sensing controllers 108L, 108R may include hand position sensors 109 to track hand movement and also may include finger position sensors 109 to track movement of individual fingers. In some embodiments, the VR reality headset 106 itself may include sensors to track hand and finger movement within a prescribed virtual field of view of the headset so that separate controllers 108L, 108R are not required. A second display screen 110 permits a supervisor or instructor to observe a VR scene viewed by a user wearing the headset 106. A rugged carrying case 112 may be used to securely store the entire simulation system 102.

Figure 2:
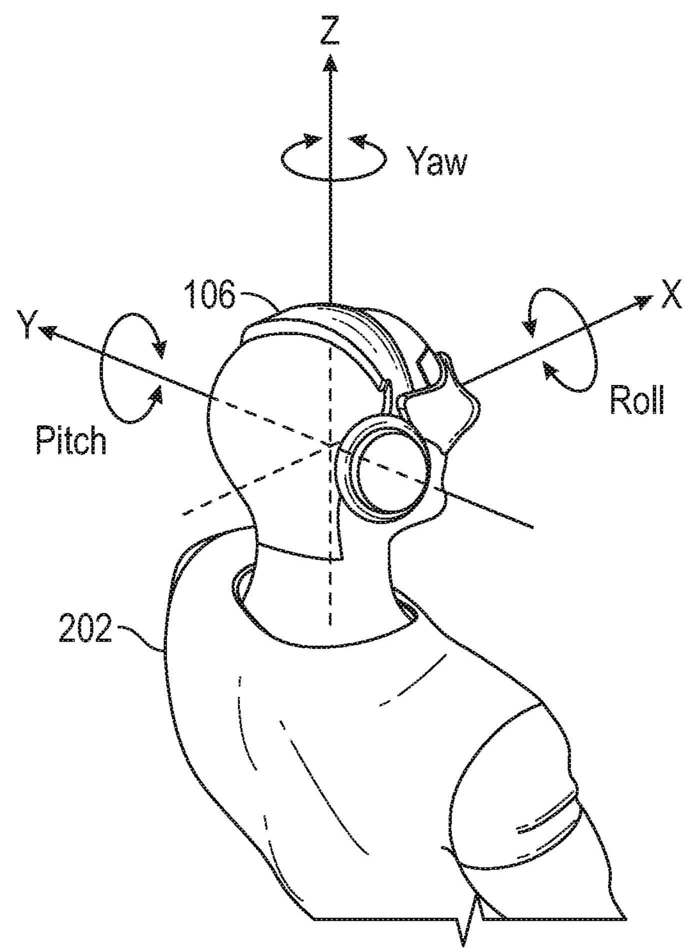
FIG. 2 is an illustrative drawing showing motions and orientations that may be tracked by a virtual reality (VR) headset in accordance with some embodiments.

FIG. 2 is an illustrative drawing showing motions and orientations that may be tracked by a VR headset 106 in accordance with some embodiments. A VR headset may be equipped with sensors to track headset motion in six degrees of freedom (6-DOF), which includes yaw, pitch and roll. A VR headset changes a user's perspective of a virtual scene based upon headset orientation. As a user 202 moves his head while wearing the headset 106, head position/motion tracking sensors within the headset may detect where the user is looking based upon direction or tilt of the user's head. Some headsets may include eye tracking position/motion sensors track a user's eye motion to determine where the user is looking. The headset 106 produces VR images based upon direction in which the position/motion tracking sensors indicate that the user is looking.

Figure 3:
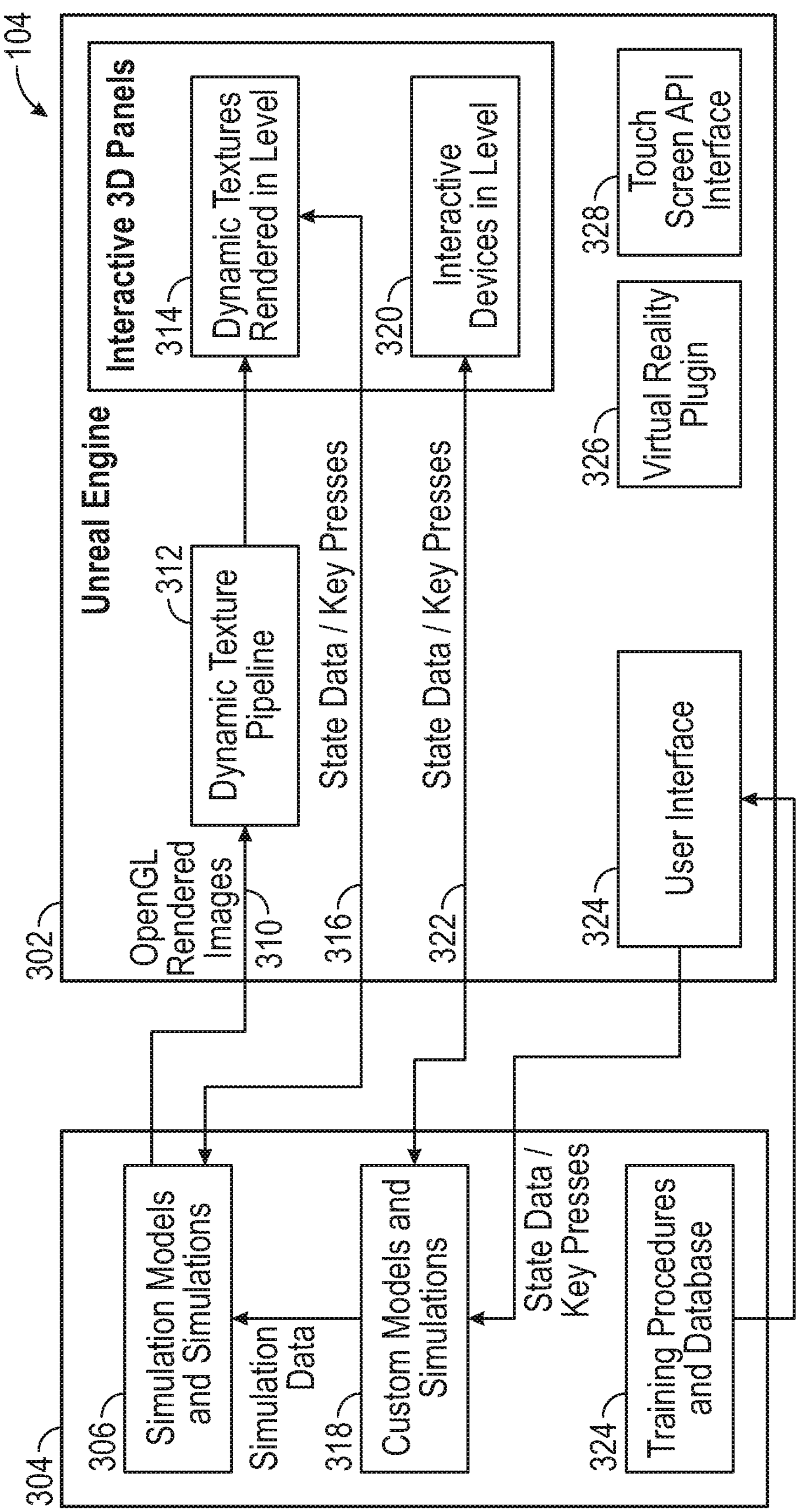
FIG. 3 is an illustrative block diagram showing details of a configuration of the of a computer system of the simulation system of FIG. 1 in accordance with some embodiments.

FIG. 3 is an illustrative block diagram showing details of a configuration of the of the computer system 104 in accordance with some embodiments. The computer system 104 is configured to include a video game engine 302 to perform image generation related tasks such as rendering three-dimensional objects, handling physical interactions of the rendered objects, audio, user interfaces, and automatic periodic updating screen image displays. In some embodiments, the video game engine includes an embodiment of the Unreal™ video game engine. A storage device 304 stores first simulation models 306. In some embodiments, the simulation models simulate aircraft control panels and interior aircraft cockpit views. The simulation models include mission software for the actual aircraft, which may be used for realism during simulation. The simulation models include simulated avionics running on a virtual machine to simulate real avionics behavior in response to the mission software.

A renderer 310 renders VR images of an aircraft control panel. In some embodiments, the VR images are rendered in accordance with the OpenGL specification and are then translated to the DirectX specification, which is used by the video game engine 302. A dynamic texture pipeline 312 integrates simulated aircraft control data to VR control panel. In some embodiments, the simulation models include captured screen displays referred to as 'textures'. In some embodiments, the texture is refreshed twenty times per second, for example, and at each refresh, dynamic texture pipeline 312 updates virtual control data displayed within VR control panels so that the VR control panel simulation is continually updated with the latest control data.

An interactive simulation block 314 controls display of the rendered control panel objects by the VR headset 106 based upon headset orientation. The interactive simulation block 314 receives user input signals based upon tracking of user hand and/or finger motion. The user input signals may be used to change the VR display based upon a user's interaction with VR control surfaces such as VR buttons, or switches or touch screen, for example. The interactive simulation block 314 may communicated state data/key press information 316 to request updates from the first simulation models 306 based upon user input interaction with VR control panel control surfaces. A virtual reality plug-in 326 permits plug-in of the VR headset 106 and the position sensing controllers 108L, 108R.

The storage device 304 stores second (e.g., custom) simulation models 318, which includes a mission computer simulation and various avionics simulations. Interactive devices block 320 controls the 3D implementation and possible states of 3D rendered control panels that do not contain externally rendered screen images. The interactive devices block 320 may communicated state data/key press information 322 to request updates from the second simulation models 318 based upon tracking of user hand and/or finger motion. The storage device 304 also stores training procedures information database 324 to enable the loading of training procedures while containing the logic required to score the accuracy of the procedures execution by end-users.

In alternative embodiments, the first display screen includes a touch screen interface and a user interacts with a VR scene via the first display screen 105 rather than via the headset 106 and the position sensing controllers 108L, 108R. To support such alternative touch screen embodiments, user interface (UI) block 328 implements touch screen interface functionality such as gesture input to the first display screen 105 to navigate and select control surfaces on a flat screen to activate, for example. In some embodiments, the UI block 328 may implement picture-in-picture display.

VR Scene Sequence with Visual Portal for Non-Contiguous Locations

Figure 4:
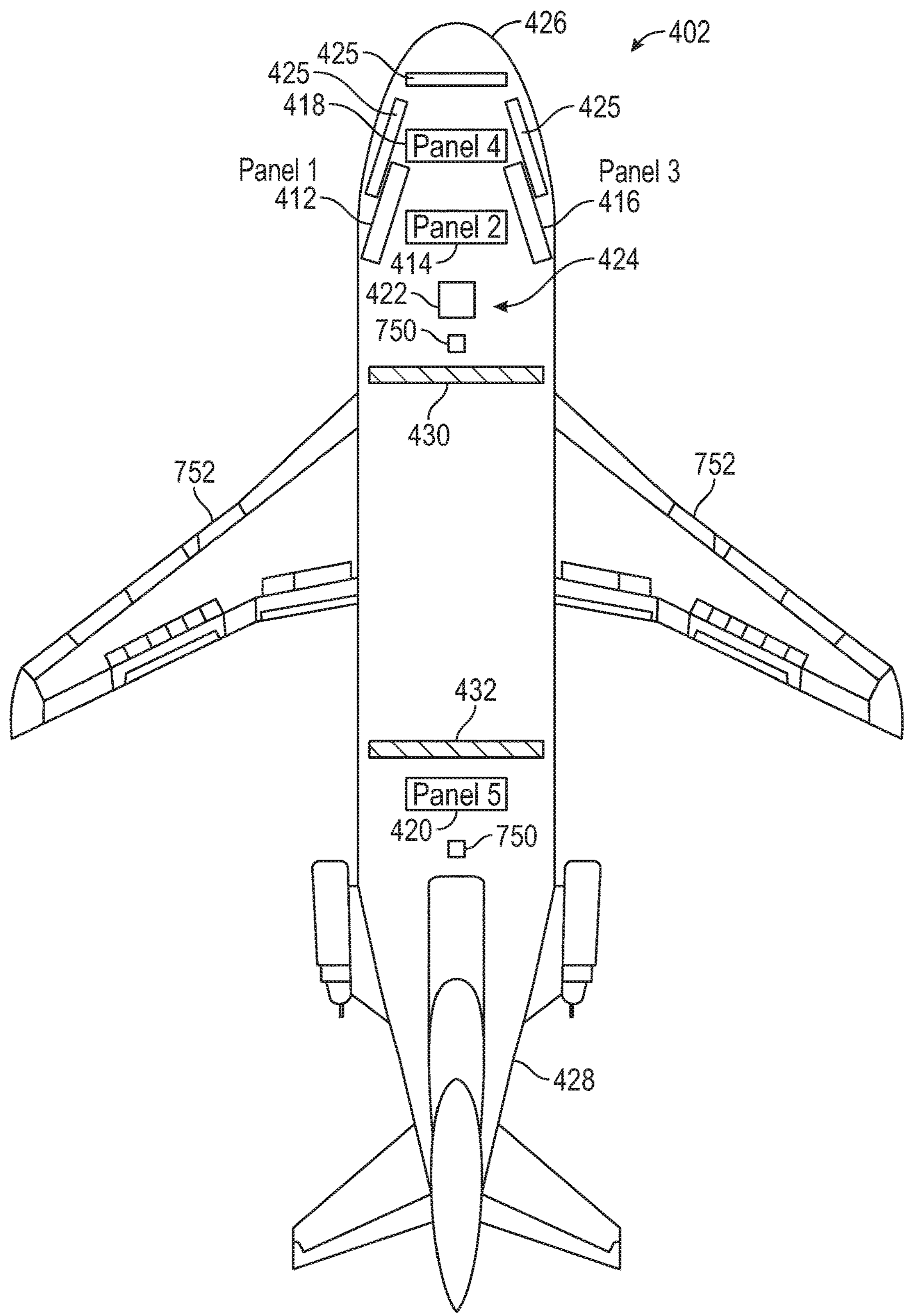
FIG. 4 is an illustrative drawing representing a generalized example physical real-world layout of example aircraft and aircraft control panels.

FIG. 4 is an illustrative drawing representing a generalized example physical real-world layout of example aircraft 402 and aircraft control panels 412-420. Multiple cockpit control panels 412-418 are disposed within a cockpit region 424 with windows 425 within view from a pilot's seat location 422 near a front portion 426 of the aircraft 402. A control panel 420 is disposed at an aft portion 428 of the aircraft 402. The front portion 426 and aft portion 428 of the aircraft 402 are spatially separated from each other and have barriers 430, 432, such as one or more bulkheads, between them. A real-world user, such as a pilot, is disposed at the seat location 422 with the multiple cockpit control panels 412-418 within view. A first panel 412 is positioned at eye level to the left of the pilot location 422 so that the pilot must glance left to view it. A second panel 414 is disposed at eye level directly in front of the pilot location 422 so that the pilot may face front to view it. A third panel 416 is disposed at eye level to the right of the pilot location 422 so that the pilot must glance right to view it. A fourth panel 418 is disposed directly in front of the pilot location 422 above eye level so that a pilot may face front and glance upward to view it.

Figure 5:
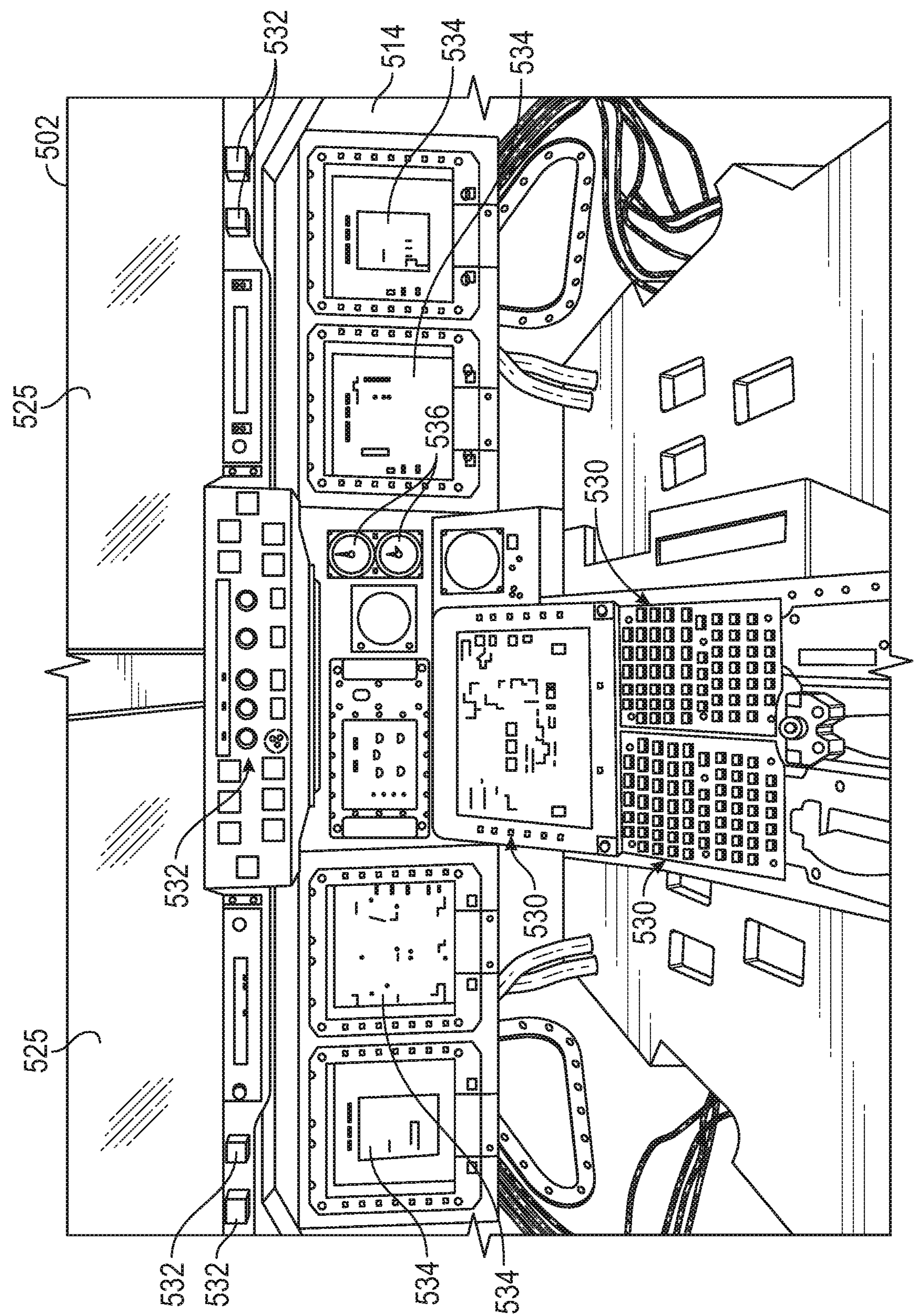
FIG. 5 is an illustrative drawing representing an example VR scene that includes a VR control panel corresponding to a real-world control panel, in accordance with some embodiments.

FIG. 5 is an illustrative drawing representing an example VR scene 502 that includes a second VR control panel 514 with VR windows 525 corresponding to the real-world second control panel 414, in accordance with some embodiments. The example VR scene 502 including the second VR control panel 514 is displayed to a user wearing the VR headset 106 while head (or eye) position/motion tracking sensors within the headset 106 indicate that the user's eyes are looking in a direction facing as if to view at eye level directly in front of the real-world pilot location 422, where the real-world second control panel 414 is located in FIG. 4. The second VR control panel 514 includes VR objects such as VR buttons 530, VR switches 532, and VR display screens 534 and VR display dials 536, to simulate corresponding physical real-world buttons, switches, and display screens (not shown) of the corresponding real world control panel 414.

Thus, VR objects visible within a VR scene may have appearances and virtual locations to simulate appearances and physical locations of corresponding physical real-world objects. The VR headset 106 may project a VR scene representing a portion of an aircraft in a user's field of view (FOV) to simulate the appearance of the real-world objects within a real-world aircraft based upon a position of the headset (or a user's eyes) used to view a virtual setting. As used herein a 'virtual setting' refers to VR images projected by a VR headset within a user's field of view. A user may cause a VR headset to change the VR setting by changing his or her field of view by moving head (or eyes) to look left or right or forward or to look upward or downward, for example.

A real-world activity, such as aircraft maintenance for example, may require a real-world user to change physical locations within a physical real-world setting to view and manually interact with different physical real-world objects that are physically spaced apart, that have physical barriers between them, or that require viewing from different viewing angles or lines of sight, for example. Referring to FIG. 4 for example, a maintenance officer might have to change physical locations and walk between the foreword and rear portions 426, 428 of the aircraft 402 to view the both the multiple control panels 412-418 in the foreword portion 426 and to view the control panel 420 located in the rear portion 428. In simulating a real-world activity in a virtual setting, rather than requiring that a user change physical real-world locations to view different physical objects at located different non-contiguous physical locations, a VR scene projected by the headset 106 may be changed between different VR scenes representing the different non-contiguous locations.

Figure 6:
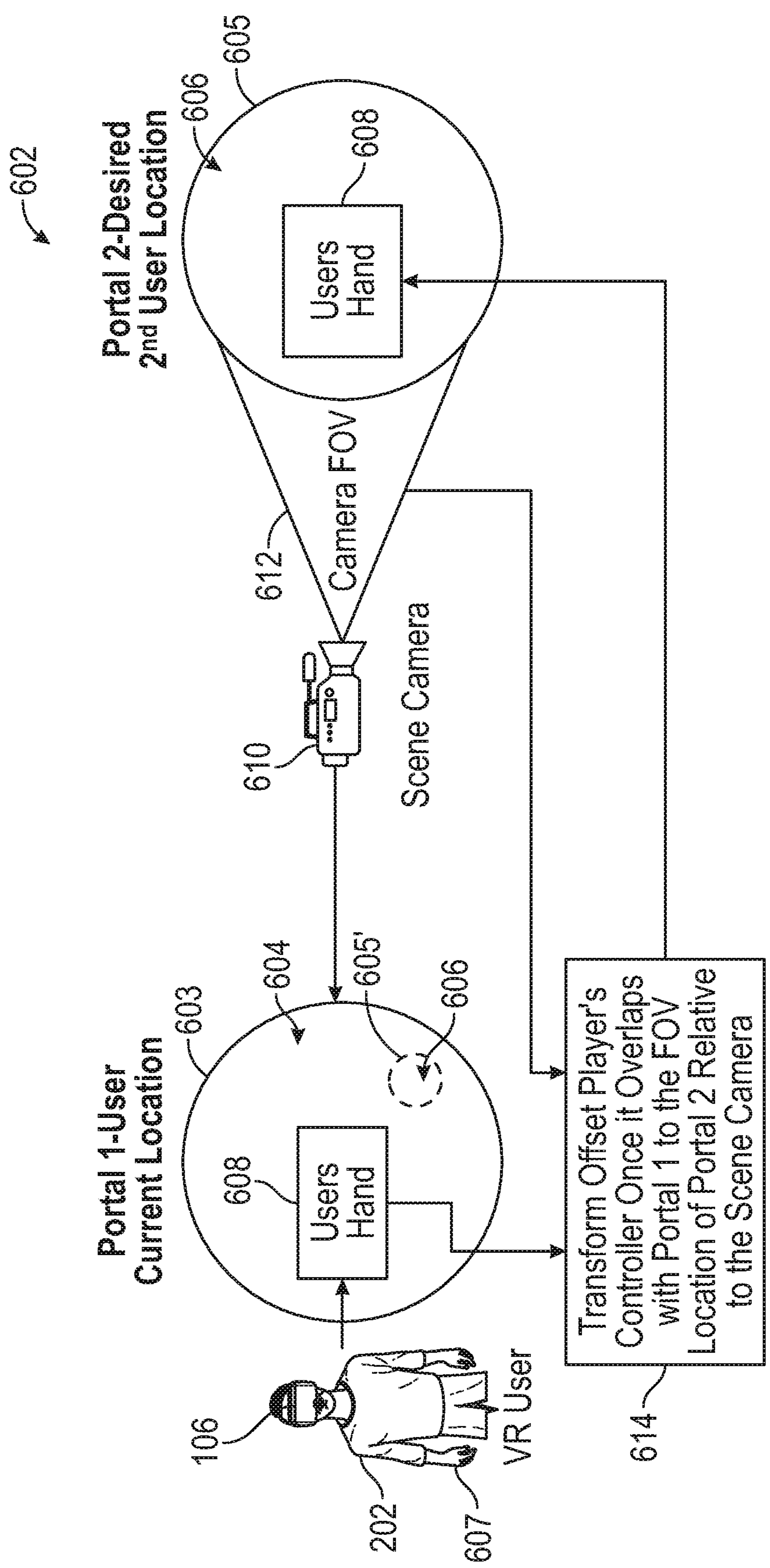
FIG. 6 is an illustrative functional diagram representing a method to simultaneously display a VR setting displaying a first VR scene and a visual portal displaying a second VR scene in accordance with some embodiments.

FIG. 6 is an illustrative functional diagram representing a method 602 to simultaneously display a VR setting 603 displaying a first VR scene 604 and a visual portal 605 (sometimes referred to as a 'wormhole') displaying a second VR scene in accordance with some embodiments. The first and second VR scenes 604, 606 may correspond to different non-contiguous real-world settings. The first VR scene 604 may be produced within the user's field of view by a headset 106 based upon orientation of a user's head (or eyes) and may represent a first real-world setting such as the interior of the airplane cockpit 424, for example. The second VR scene 606 may be produced simultaneously within the user's field of view by the headset 106 based upon an VR image produced by a virtual scene camera 610. The second VR scene 606 may represent a physically non-contiguous real-world setting such as aft portion 428 of the aircraft 402.

More specifically, the VR headset 106 projects the first VR scene 604 within the VR setting 603, which includes the user's field of view (FOV). The first virtual scene 604 may include VR hand images 608. Hand-mounted position sensing controllers 108L, 108R determine a physical real-world 3D offset position of a user's real-world hand 607 relative to the headset 106. (In some embodiments, the headset may determine hand location without the aid of hand-mounted controllers.) The headset 106 may transform the physical real-world offset position between the headset 106 and the user's actual hand 607 to a virtual offset position between the VR hand image 608 in the first VR scene 604 and other virtual objects in the first virtual scene 604 such as virtual buttons, switches, and display screens displayed on a VR control panel, for example. Simultaneously with the VR headset producing the first VR scene 604, a virtual scene camera 610 produces the second VR scene 606 from a virtual scene camera VR field of view 612. The virtual scene camera 610 may include a process implemented through configuration of the computer system 104 to determine a virtual scene based upon a virtual position of at least one virtual object, such as a virtual aircraft control panel component, from a virtual point of view, that corresponds to a position of at least one corresponding real-world object such as a real control panel component, from a real-world point of view. The dashed lines 605', shown within the first VR scene 604, represent the visual portal 605 that encompasses the second VR scene 606 within it overlaying a portion of the first VR scene 604.

A user physically may move his real-world hand 607 to shift a corresponding virtual hand image 608 between the simultaneously projected first and second VR scenes 604, 606. Functional block 614 determines where a virtual hand position is located in relation to the virtual setting. The functional block 614 determines that when the virtual hand image 608 is projected within the first VR scene 604, the headset 106 determines a virtual offset between the headset 106 and the VR hand image 608; and determines an offset between the VR hand image 608 and one or more VR objects within the first VR scene 604 based upon an offset between the headset 106 and the one or more VR objects in the first VR scene 604 and the offset between the headset 106 and the hand image 608. Conversely, the functional block determines that when the virtual hand image 608 is projected within the second VR scene 606, the headset 106 determines a virtual offset between the headset 106 and the VR hand image 608; and determines an offset between the VR hand image 608 and one or more VR objects within the second VR scene 606 based upon an offset between the headset 106 and the one or more VR objects in the second VR scene 606 and the offset between the headset 106 and the hand image 608.

Figure 7:
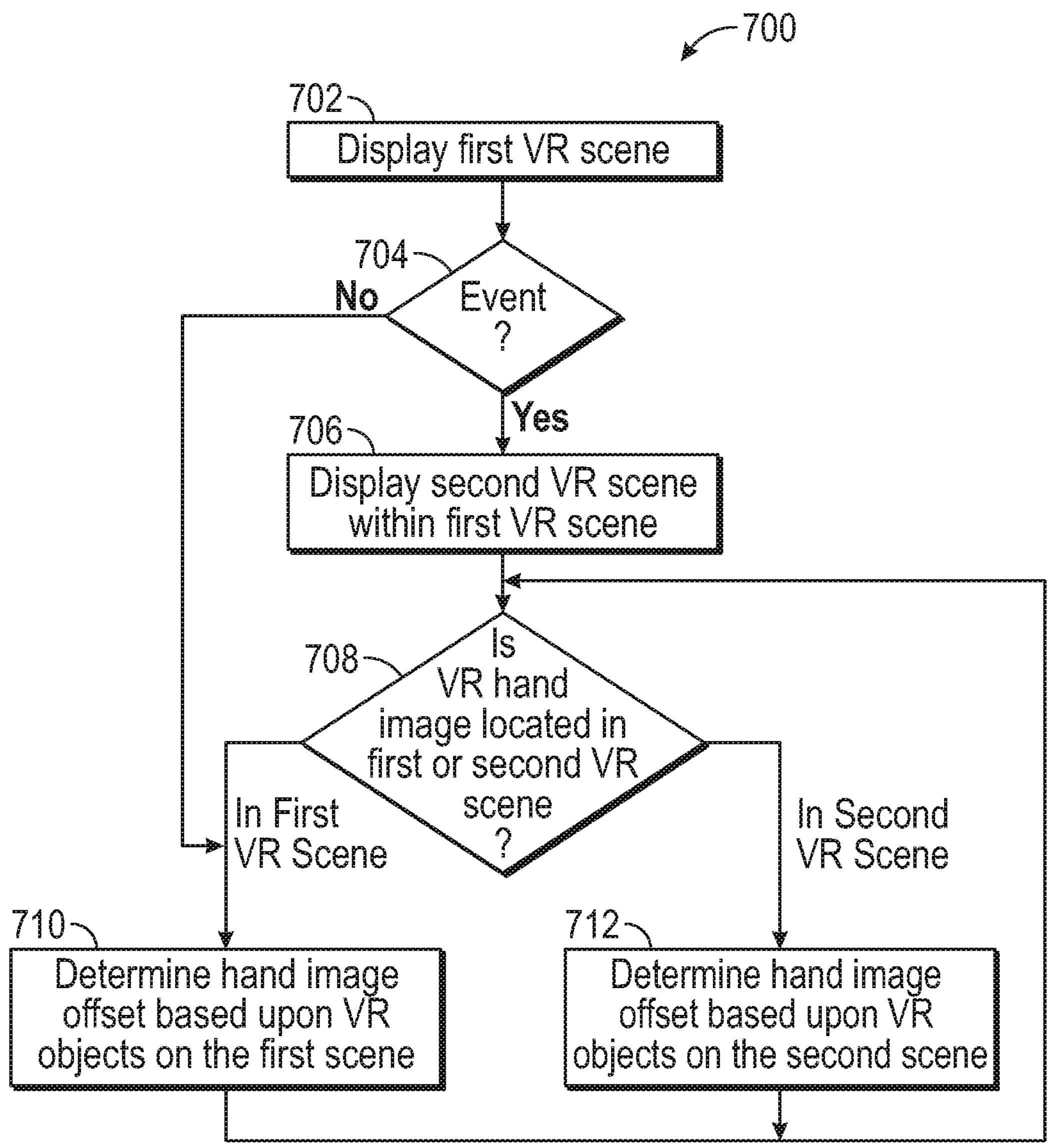
FIG. 7 is an illustrative flow diagram of a first process to project a VR hand image in a VR setting that includes a first VR scene and a visual portal that includes a second scene in accordance with some embodiments.

FIG. 7 is an illustrative flow diagram of a first process 700 to project a VR hand image 608 in a VR setting 603 that includes a first VR scene 604 and a visual portal 605 that includes a second VR scene 606 in accordance with some embodiments. The simulation system 102 may be configured with instructions to perform the activities of the blocks in the first process. At block 702, the headset 106 projects the first VR scene without the visual portal 605. Decision block 704 determines whether a prescribed event has occurred. They even may include a user's performance of a task in a checklist such as an engine start scenario that requires two personnel in the real world to accomplish together, for example. In response to a determination that the event has not occurred, control flows to block 710, and the headset 106 determines offset of a VR hand image 608 based upon virtual location of VR objects in the first VR scene 604. In response to a determination that the event has occurred, block 706 displays the second VR scene 606 within the visual portal 605. Thus, in response to an occurrence of the event, both the first and second VR scenes 604, 606 are projected simultaneously by the headset 106 within the VR setting 603, which encompasses a user's FOV. Block 708 determines whether the VR hand image 608 is projected within a portion of the VR setting 603 that displays the first VR scene 604 or that displays the second VR scene 606. In response to a determination that the VR hand image 608 is displayed in the first VR scene, control flows to block 710, and the headset 106 determines offset of the VR hand image 608 based upon virtual location of VR objects in the first VR scene 604. In response to a determination that the VR hand image 608 is displayed in the second VR scene, control flows to block 712, and the headset 106 determines offset of the VR hand image 608 based upon virtual location of VR objects in the second VR scene 606.

FIGS. 8A-8D are illustrative drawings representing a sequence of VR scenes produced using a VR headset as a user, such as an aircraft maintenance officer, works through a sequence of tasks, such as an aircraft maintenance checklist in accordance with some embodiments. Referring to FIG. 4 and to FIGS. 8A-8D, a maintenance procedure may require the user to first, gaze at and to actuate controls on the first control panel 412; to second, gaze at and actuate controls on the third control panel 416; to third, gaze at and actuate controls on the second control panel 414; to fourth, gaze at and actuate controls on the fifth panel 420; and fifth, gaze at and actuate controls on the fourth panel 418. The first through fourth control panels 412-218 are located within the aircraft cockpit 424 in physical proximity to each other but the fifth control panel 420 is physically non-contiguous in the aft portion 428 of the aircraft 402.

Figure 8A:
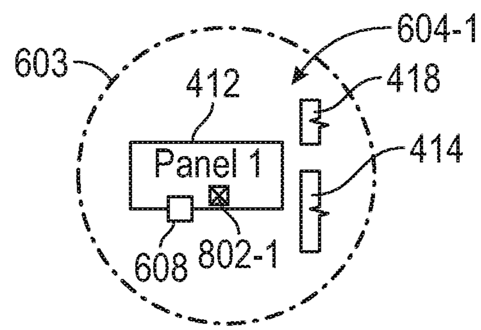
FIGS. 8A-8E are illustrative drawings representing a sequence of VR scenes produced using a VR headset as a user works through a sequence of tasks in accordance with some embodiments.
Figure 8B:
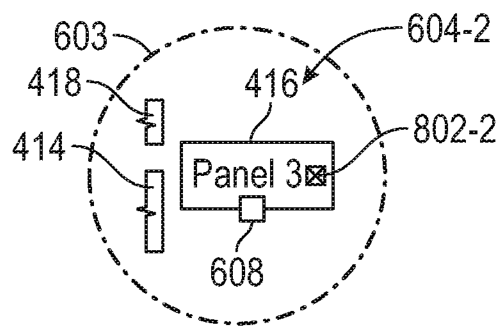
Figure 8C:
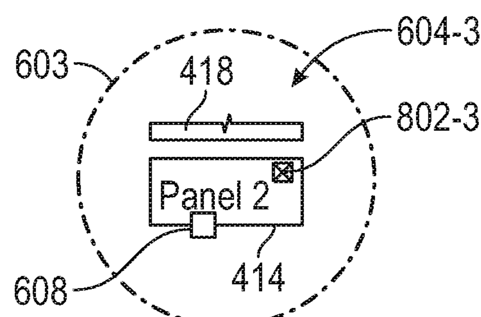
Figure 8D:
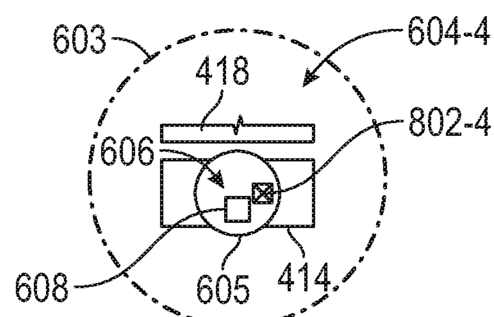
Figure 8E:
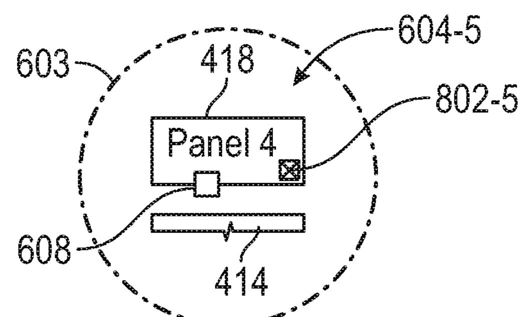

FIG. 8A is an illustrative drawing showing the first VR scene 604-1 projected by the VR headset 106 as the user turns his head (or eyes) to the left in a direction of the first panel 412. The user moves a hand 607 to actuate a virtual control 802-1 on the first panel 412 within the first VR scene 604 to perform a first task such as applying external aircraft power A virtual hand image 608 is projected within the first VR scene 604-1. FIG. 8B is an illustrative drawing showing the first VR scene 604-1 projected by the VR headset 106 as the user turns to the right in a direction of the third panel 416. The user moves a hand 607 to actuate a virtual control 802-2 on the third panel 416 within the first VR scene 604 to perform a second task such as starting the auxiliary power unit. FIG. 8C is an illustrative drawing showing the first VR scene 604-3 projected by the VR headset 106 as the user turns to face forward to look in a direction of the third panel 416. The user moves a hand 607 to actuate a virtual control 802-3 on the third panel 416 within the first VR scene 604 to perform a third task such as starting the aircraft engines. FIG. 8D is an illustrative drawing showing the first VR scene 604-4 that includes the second VR scene 606 within a visual portal 605. The visual portal 605 supplants a portion of the first VR scene 604-4. Projection of the second VR scene 606 may be triggered by an event such as the user's completion of the third task, for example. The visual portal 605 is displayed overlaying a portion of the second panel 414. To view the second scene 606 within the visual portal 605, the user faces forward to look in a direction of the second panel 414, which is partially hidden behind the visual portal 605. The user moves a hand 607 to actuate a virtual control 802-4 on the fifth panel 420 within the second VR scene 606 to perform a fourth task such as loading a communication plan. FIG. 8E is an illustrative drawing showing the first VR scene 604-5 projected by the VR headset 106 as the user turns to faces forward and looks upward in a direction of the fourth panel 418. The user moves a hand 607 to actuate a virtual control 802-5 on the fourth panel 416 within the first VR scene 604 to perform a third task such as moving flight control surfaces to system operation.

Picture-in-Picture to Add Viewpoints to Display Screen

Figure 9A:
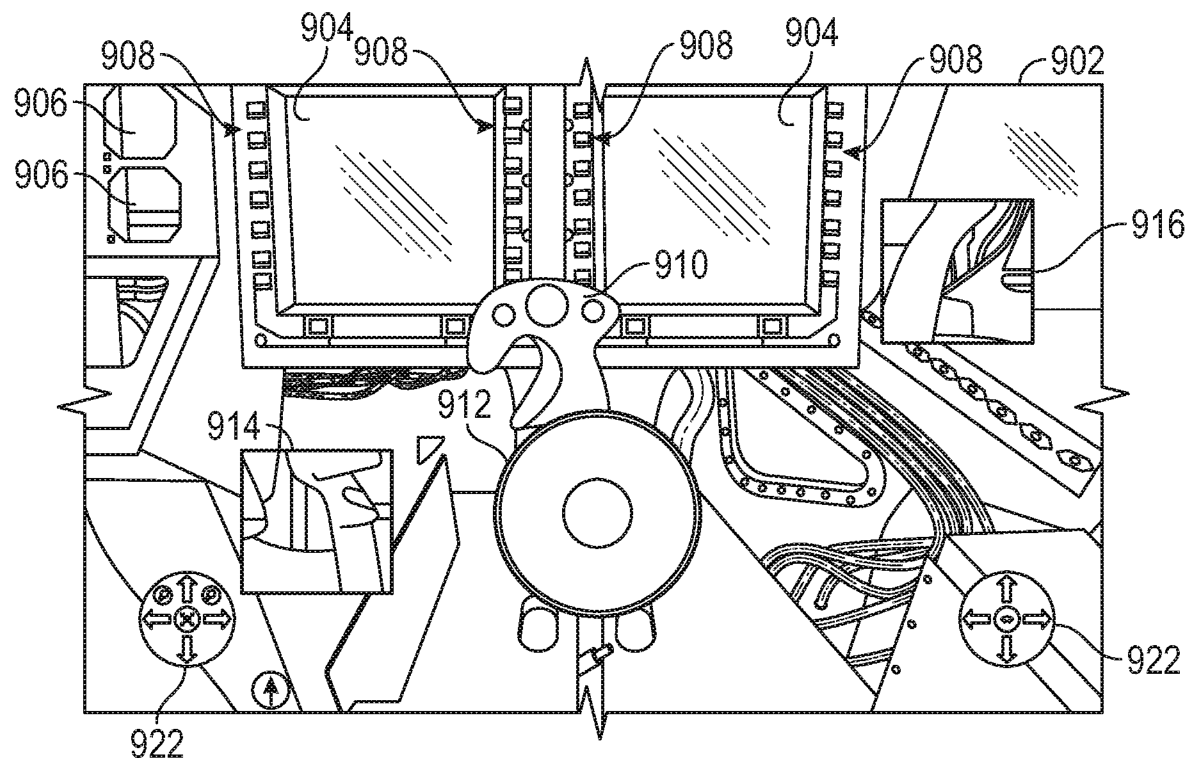
FIGS. 9A-9B are illustrative drawings showing interactive VR images representing portions of an aircraft cockpit control panel that include picture-in-picture (PIP) images in accordance with some embodiments.
Figure 9B:
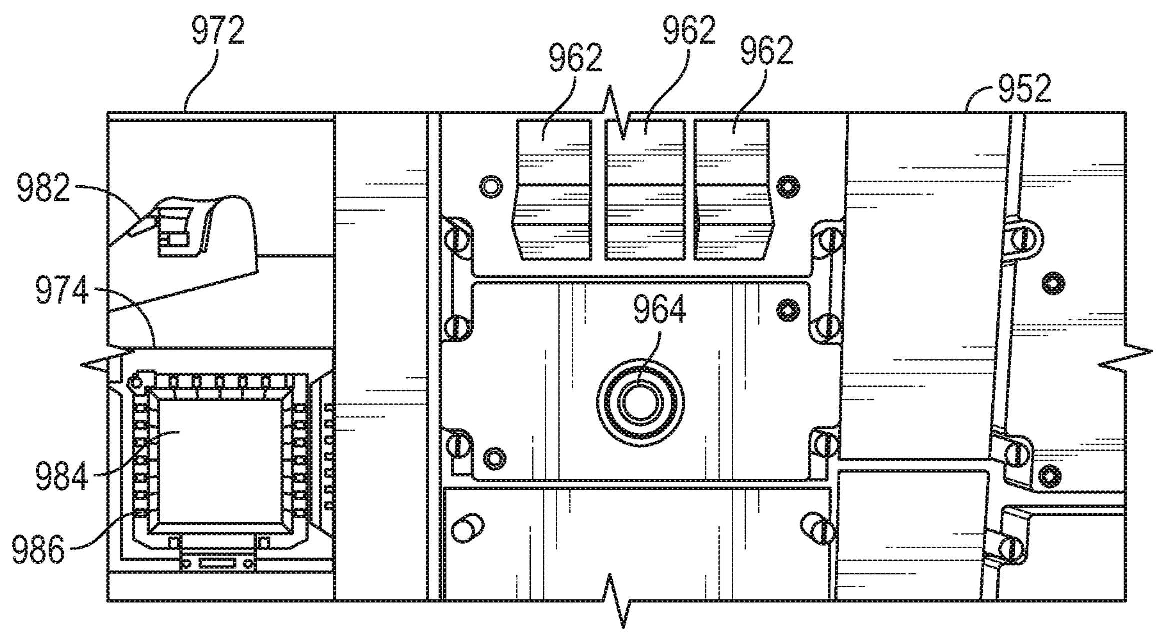

FIGS. 9A-9B are illustrative drawings showing an aircraft cockpit control panel image 902 displayed on a display screen 105 that include interactive picture-in-picture (PIP) images 912, 914, 916 in accordance with some embodiments. Rather than display the images using a VR headset 106, object images may be displayed on the display screen 105 of the simulation system 102 of FIG. 1, for example. In some embodiments, the display screen 105 is implemented as a flat panel display (FPD) having multi-touch functionality that supports user touch gestures such as to pinch zoom-in and to pinch zoom-out and to pan with two finger touch, for example. Referring back to FIG. 4, images of an aircraft cockpit's control panels 412-418 and images of objects such as aircraft wings 752, visible out an aircraft's cockpit windows 425 may be captured by the virtual scene camera 750 disposed to capture images from a pilot's viewpoint or from a flight mechanic's viewpoint, for example. The scene camera 750 records while panning and zooming to capture cockpit control panel images from the perspective of a pilot seated in the cockpit and from the perspective of a flight mechanic in an aircraft aft portion 428. PIP images are captured separately for objects or surfaces that generally are not within a pilot's line of sight from the cockpit.

FIG. 9A is an illustrative drawing showing the display screen 105 displaying a control panel image 902 that includes that includes display screen images 904, display panel dial images 906 and display panel button images 908, for example. The control panel image 902 also includes a joystick image 910 and a first PIP image 912 that overlays a portion of the joystick image 910 and that indicates a first interactive control panel region of the screen display 105 to receive user input to impart first joystick functionality. The control panel image 902 also includes second and third PIP images 914, 916 representing left and right side views of a real-world joystick (not shown) that are not visible in the control panel image 902. The second and third PIP images 914, 916 may indicates a second and third interactive control panel regions of the screen display 105 to receive user input to impart second and third joystick functionality. The first view also includes user interface elements 922 for navigation when using the display screen 105. The first, second, and third PIP images 912, 914, 916 may be spawned in response to an interactive touch gesture such as tapping upon the PIP images. The first PIP image 912, which is shown as having a circular contour, acts as an interactive user control surface to simulate joystick control functions. Moving the inside circle within the bounds of the outside circle is translated to joystick movement accordingly. The second PIP image 914 displays a left side of the joystick that contains the joystick push to talk control that is not directly visible from the pilot's perspective. Perspective. The second PIP image 914 is interactive enabling activation of the push to talk control. The third PIP image 916 displays a right side of the joystick that contains the trigger control that is not directly visible from the pilot's perspective. The third PIP image 916 is interactive enabling activation of the trigger control. A user may close the first, second and third PIP images 912, 914, 916 by clicking the user interface control in the bottom center of the screen to 'undock' from the joystick panel.

FIG. 9B is an illustrative drawing showing an aircraft cockpit control panel image 952 displayed on a display screen 105 displaying a zoomed-in portion of a control panel that includes two-way button images 962 and a rotatable dial switch 964. The control panel image 952 includes fourth and fifth PIP images 972, 974 respectively representing an example aircraft wing image 982 visible out of an aircraft cockpit window, and a display screen 984 and including interactive switch images 986. The third and fourth PIP images 972, 974 may be spawned while the aircraft cockpit control panel image 952 is zoomed in on the portion of the control panel that includes the rotatable dial switch 964, which may represent a blade fold wing stow control switch that may function to simulate folding or unfolding of an aircraft wing in response to an interactive touch gesture such as tapping upon the blade fold wing stow panel image 964.

Figure 10:
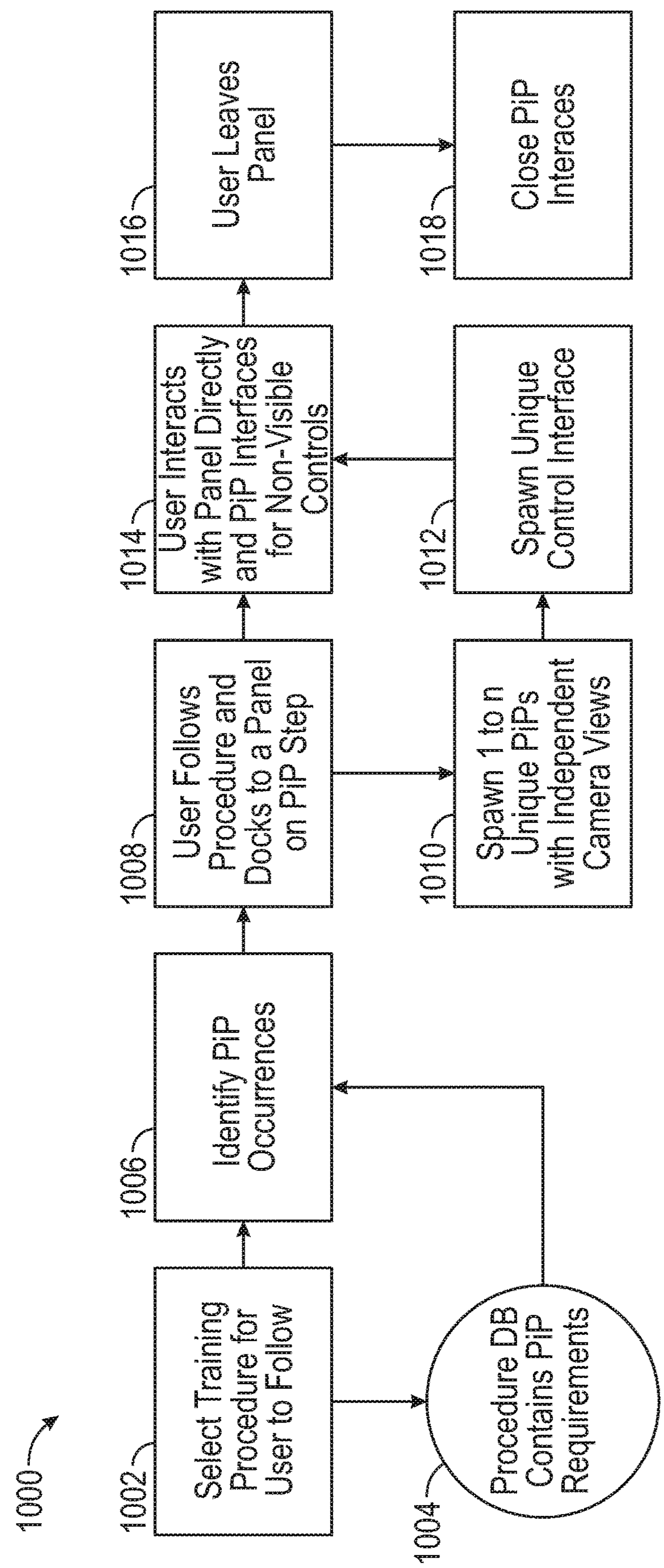
FIG. 10 is an illustrative flow diagram representing a second process for generation and interaction with PIP images on a display screen having in accordance with some embodiments.

FIG. 10 is an illustrative flow diagram representing a second process 1000 for generation and interaction with PIP images on a display screen 105 having multi-touch functionality in accordance with some embodiments. The simulation system 102 may be configured with instructions to perform the activities of the blocks in the second process. At block 1002, a user selects a training procedure such as an aircraft maintenance procedure. Different training procedures may require different sequences of user tasks, which may require different combinations of PIP images. The selected training procedure may involve the control panels 412-420 and tasks described with reference to FIG. 4, for example. Thus, it will be appreciated that the training procedure may be performed with either a VR headset 106 or with a FPD. A database storage 1004 stores PIP images associated with control panel images. In the course of performing the simulated maintenance procedure, the user navigates the images display on the display screen 105 to select a control panel image corresponding to a panel to be used during the procedure. The navigation may include a user touching the screen to virtually rotate the camera 750 by displaying sequences of previously recorded images. Block 1006 identifies PIP images associated with control panel images associated with the selected training procedure. At block 1008, a user follows steps of the selected training procedure, which may involve using the display screen 105 to pan and zoom among control panels associated to display different portions of the aircraft control panel to simulate looking about within the cockpit and may involve touch gestures to simulate actuating different control inputs. At block 1010, in response to a user's gesture input to select an image such as the joystick image, for example, the simulation system 102 spawns one or more PIP views associated with the selected image. Such selection is sometimes referred to as 'docking' to the selected image. Block 1012 spawns one or more interactive control interfaces associated with the one or more PIP images that may be actuated by user touch or mouse-click upon corresponding display screen portions. In the course of performing the simulated procedure, a user provides input signals such as touch gestures or mouse-clicks to actuate one or more of the PIP interfaces. In response to such user input, at block 1014, the system 102 enables access to control components that are not directly visible. In response to the user input, an appearance of the control panel on the display screen 105 may be modified to indicate a change in control status, such as to show that a switch is opened or closed or to show a change in a UI screen message, for example. At block 1016, the user navigates away from the selected control panel image by imparting finger gestures to the display screen 105, for example. In response to the user's navigating away from the control panel image, block 1018 closes the one or more PIP images and their corresponding control interfaces.

Navigation Objects Hovering in a Display Screen

Figure 11A:
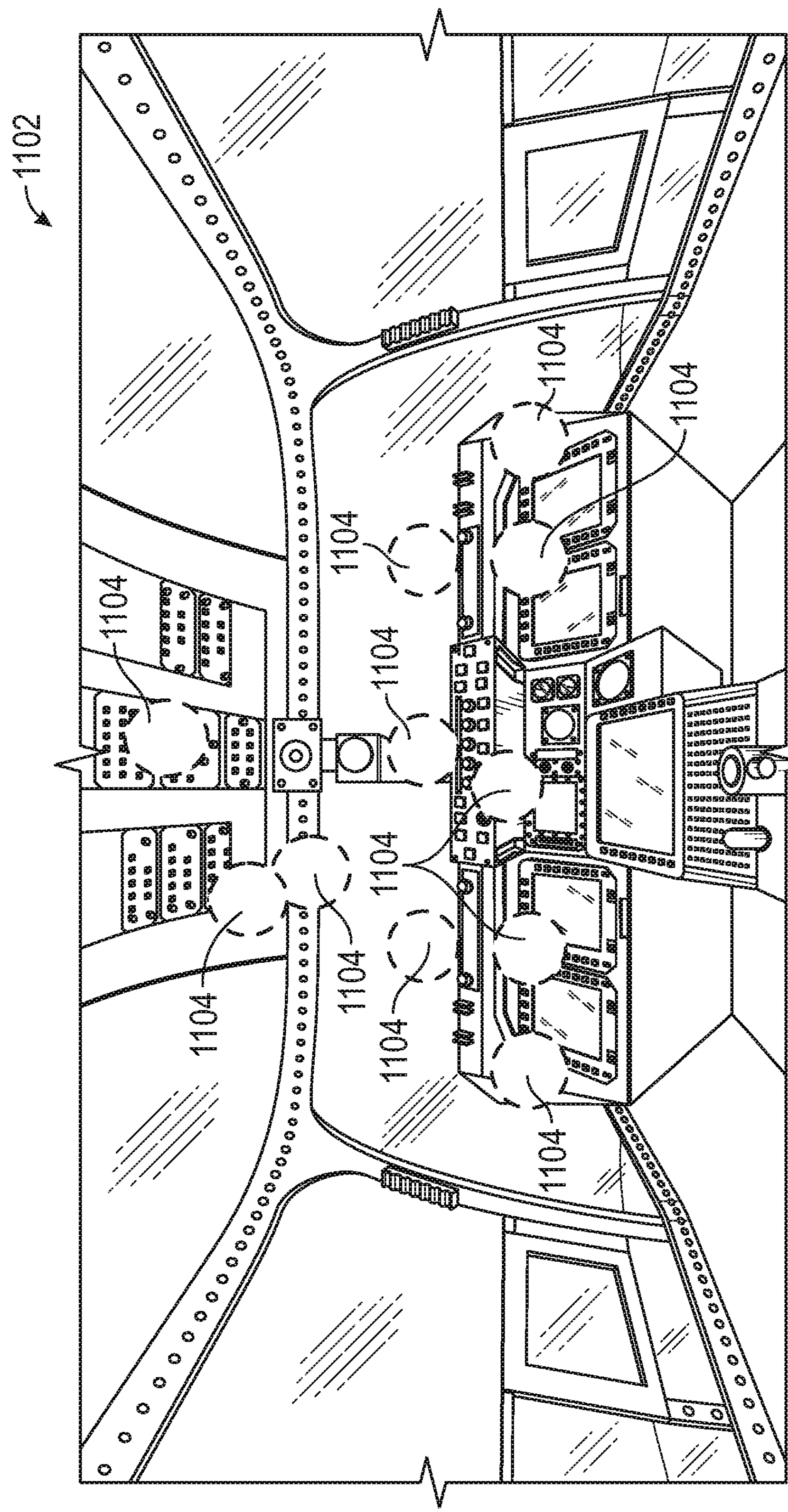
FIGS. 11A-11B are illustrative drawings showing a VR control panel and hovering navigation objects in accordance with some embodiments.
Figure 11B:
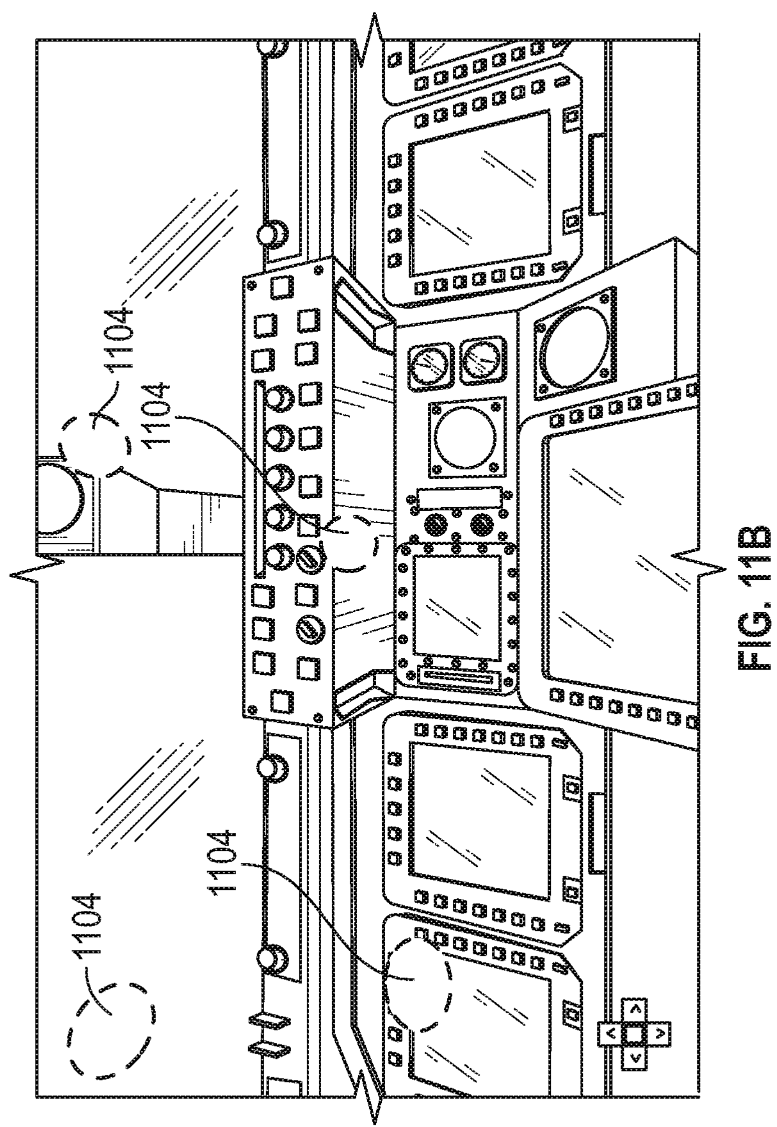

FIGS. 11A-11B are illustrative drawings showing a control panel image 1102 and hovering navigation objects 1104 in accordance with some embodiments. Rather than display the images using a headset 106, object images may be displayed on the display screen 105 of the simulation system 102 of FIG. 1, for example. In some embodiments, the display screen 105 is implemented as an FPD having single-touch functionality that supports single touch user gestures a single touch to select a view or to pan a screen image, for example.

Individual navigation objects 1104 are located in the vicinity of, (i.e. overlaying, partially overlaying, or next to) control panel portions to which they correspond. Individual navigation objects 1104 are used to activate user-touch interaction with corresponding nearby individual portions of the control panel image. Such activation is sometimes referred to as docking to the selected control panel portion. In other words, a user may select a navigation object 1104 by physically touching the display screen 105 where the selected navigation object is displayed to activate (or dock with) a control panel portion in the vicinity of (overlaid by, partially overlaid by or next to) the selected navigation object 1104. FIG. 11A shows the display screen 105 displaying a wide-view control panel view that includes multiple navigation objects. FIG. 11B shows the display screen 105 displaying a narrower zoomed-in control panel view that includes fewer navigation objects 1104 than are shown in FIG. 11A.

Figure 12:
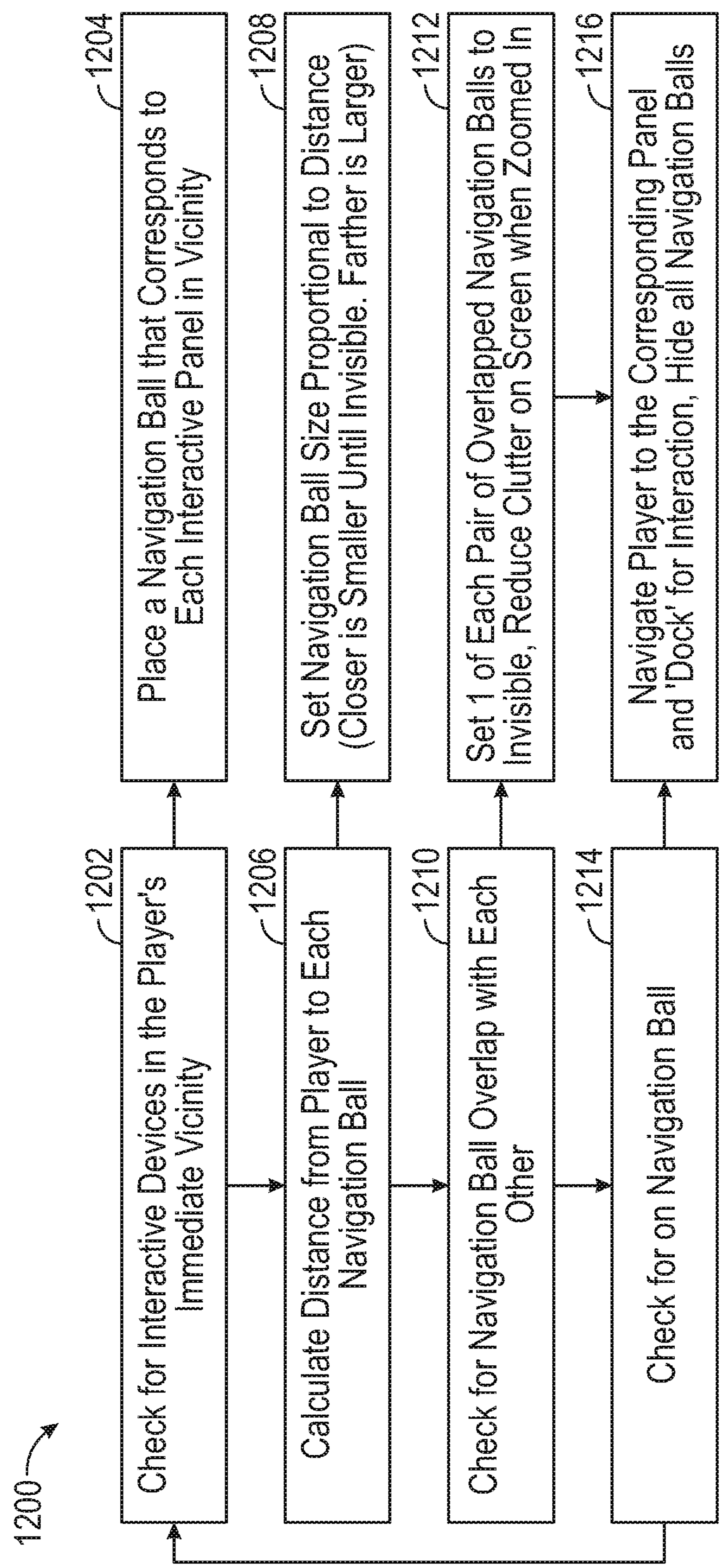
FIG. 12 is an illustrative flow diagram representing a third process for generation of and navigation among navigation objects on a display screen in accordance with some embodiments.

FIG. 12 is an illustrative flow diagram representing a third process 1200 for generation of and navigation among navigation objects 1104 on a FPD in accordance with some embodiments. The simulation system 102 may be configured with instructions to perform the activities of the blocks in the third process. Block 1202 gathers a list of the interactive control panel portions associated with a control panel image displayed on the display screen 105. At block 1204, individual navigation objects 1104 are displayed in the vicinity of corresponding to the individual control panel portions. In the illustrative embodiment, the navigation objects are displayed as circular balls, but alternate shapes may be used instead.

At block 1206, a virtual distance is determined between a virtual user (e.g., a virtual aircraft pilot) (not shown) and each navigation object 1104. It will be appreciated that this distance may vary with zoom level, for example. A zoom-in may result in a closer virtual distance between a virtual pilot and a navigation ball, and a zoom-out may result in a greater virtual distance between a virtual pilot and a navigation object, for example. Block 1208 sets size of a navigation object 1104 displayed on the display screen 105 based upon the determined virtual distance. It will be appreciated that a navigation object may be set to have a smaller size when the virtual distance from the virtual user is less so as to not take up too much screen space when the overall control panel is more zoomed-in. Conversely, a navigation object 1104 may be set to have a larger virtual size when the virtual distance from the virtual pilot is greater so as to be more easily visible when the overall control panel is more zoomed-out. Thus, a user perceives the navigation objects as having approximately the same size regardless of zoom level. At block 1210, Navigation object overlap is identified. Also at block 1210 navigation object clutter such as multiple navigation objects grouped closely together with little or no space between them is identified. In response to identifying navigation object overlap, block 1212 sets one of each pair of overlapping navigation objects 1104 to invisible. Also, in response to identifying navigation object clutter, block 1212 reduces the number of navigation objects 1104 to reduce clutter when zoomed-in. To reduce clutter, the number of navigation objects is reduced to include a waypoint that approximately corresponds to one of every two interactive panels within the field of view or panels that cannot be fully viewed within the current field of view, which are more than 50% within the current field of view.

At block 1214, the system 102 receives user input to select a navigation object 1104 by mouse-clicking or touching with a finger gesture its on-screen image, for example. At block 1216, in response to receiving a user selection of a navigation object 1104, the system 102 navigates the on-screen view to the display a control panel portion associated with the selected navigation object 1104, through panning and/or zooming, for example, and activates (or 'docks') to the associated control panel so that a user may interact with it through touch gesture or mouse-clicks, for example. The non-selected navigation objects 1104 are hidden by making them invisible while the selected control panel is activated.

Further Examples

Context sensitive user interface may be used for avionics maintenance training. When building a portable trainer, with limited screen real estate, we sometimes need multiple views of different areas of the simulation. Further, the user may need to interact with different parts of the simulation simultaneously to complete specific actions. We have created triggers in the simulation that are activated when users access specific models or control surfaces. We then automatically spawn multiple picture in picture windows that show live views of required control surfaces or simulated displays that are used in tandem. These windows can be customized per application and are invisible to the user until they are automatically created. The user can interface through these pictures in picture windows. Once the user leaves that defined control panel area, the interactive windows automatically de-spawn leaving the simulation screen uncluttered.

Some aspects may include:

- Multi-view and picture in picture events triggered automatically when a user entered a pre-defined 'zone'
- Enable simultaneous interaction with various areas of the simulation are removed when the trigger is deactivated
- Windows can be moved and resized by the user Avionics repair and installation may be used in a training in a virtual reality environment. Many training simulators utilize real physical equipment from the system in which the training in intended to teach users to use, which is typically restrictively large and expensive. All of which adds cost and reduces portability of the system. Training on physically removing, repairing, and replacing avionics would normally require at least a replication of the avionics of interested and representative tools.

Virtual Reality Head Mounted Displays and 1:1 tracked hand controllers are used in conjunction with detailed 3D models and simulations of training curriculum. The setup is portable, with hardware consisting only of the VR headset system for interfacing and a computer system running the simulation software. By use of the VR headset, the user is surrounded by the virtual training equipment, which is also presented a proper scale. The user can use the VR hand controllers to physical reach and interact with virtual objects to preform realistic motions for repair, etc. Large scale objects can be represented in a small physical area.

Some aspects may include:

- Utilizing Virtual Reality hardware and controllers to place the user in a simulated training environment where they can naturally interact with the training curriculum
- Virtual equipment to perform repair and installation procedures.
- Users may virtually, with no additional tools or hardware, use simulated tools in their hand to remove avionics, pull them apart, and replace them with realistic motions while learning how to do for the real hardware.
- This approach may also allows quickly swapping between multiple different scenarios/procedures with no additional hardware required.
- This product is also portable using a VR system and a personal computer system.

Avionics maintenance procedure and interface training in a Virtual Reality environment. Many current maintenance training simulations make use of real or replica hardware which can be large and expensive. Additionally, if you are required to achieve realistic scale and location using 3D modes, then you may need multiple large monitors. The problem we are solving is providing realistic immersive training while interactive with full scale equipment from a small or restricted physical space, while keeping the system portable.

Utilizing Virtual Reality hardware and hand tracking controllers combined with simulation software, we can virtualize the training curriculum in a portable form factor. Further, the VR technology enables the user to be surrounded by the simulation which appears full scale regardless of the physical location that the user is training in. The user uses the tracked controllers to interact with knobs, buttons, switches, levelers, etc. as they would in real life.

Some aspects may include:

- Utilizing a Virtual Reality system with tracked hand controllers combined with maintenance simulation software to enable users to realistically interact with full scale system controls while following maintenance procedures without requiring additional hardware.
- The system is portable and can be set up anywhere that there is power available for a personal computer system.

Top level User Interface organization and layout for a maintenance training simulation. Embodiments may create a standard way for end-users to launch, control, and navigate through a training simulation in a way that is intuitive, without cluttering the limited screen real estate. Each menu element is functional with keyboard, mouse, and/or touch screen interchangeably.

1) An "IOS" menu may be positioned at the top left of the screen, can be hidden by clicking the upper portion of the menu. The IOS menu enables users to select the specific parameters for their desired simulation, launch the simulation, and shut down the simulation. The menu can be viewed and interacted with by clicking a transparent IOS button at any time during the simulation and re-hiddin.

2) A 'shortcut' menu may be similar to the IOS menu in that it is organized as a vertical list of options that can be hidden and recalled. The shortcut menu is located on the top right of the screen. The shortcut menu lists areas of the simulation that the user may need to interact with based on the current location of the user's character. When hovering over menu options, a live preview of where the shortcut will take the user is shown at the bottom of the menu.

3) Direct navigation 'balls'. These navigation balls are placed strategically throughout the 3D simulation. They are used by touching or clicking one in the area that you want to navigate to and you are taken to that spot. This is an alternate to the shortcut menu. The balls reduce in number and grow in size as you get farther away and vis versa as you get closer in the simulation. The balls can be hidden if the shortcut menu is more desirable for a particular user.

4) At the bottom left of the screen there may be a 5-way selection that will pan the user left, right, up, down. The center button will spin the users view 180 degrees.

5) The touch screen can be swiped left right up and down to rotate the users view in the simulation. Combined, this menu system make for a complete navigation and control solution for simulated training devices. Non-desired controls can be disabled/hidden until such a time that they are required.

Some aspects may include:

The specific layout of the menu interface system.

The preview of the shortcut location.

The shortcut balls.

How they grow in number and shrink in size as more details appear in the simulation.

Computer System Hardware

Figure 13:
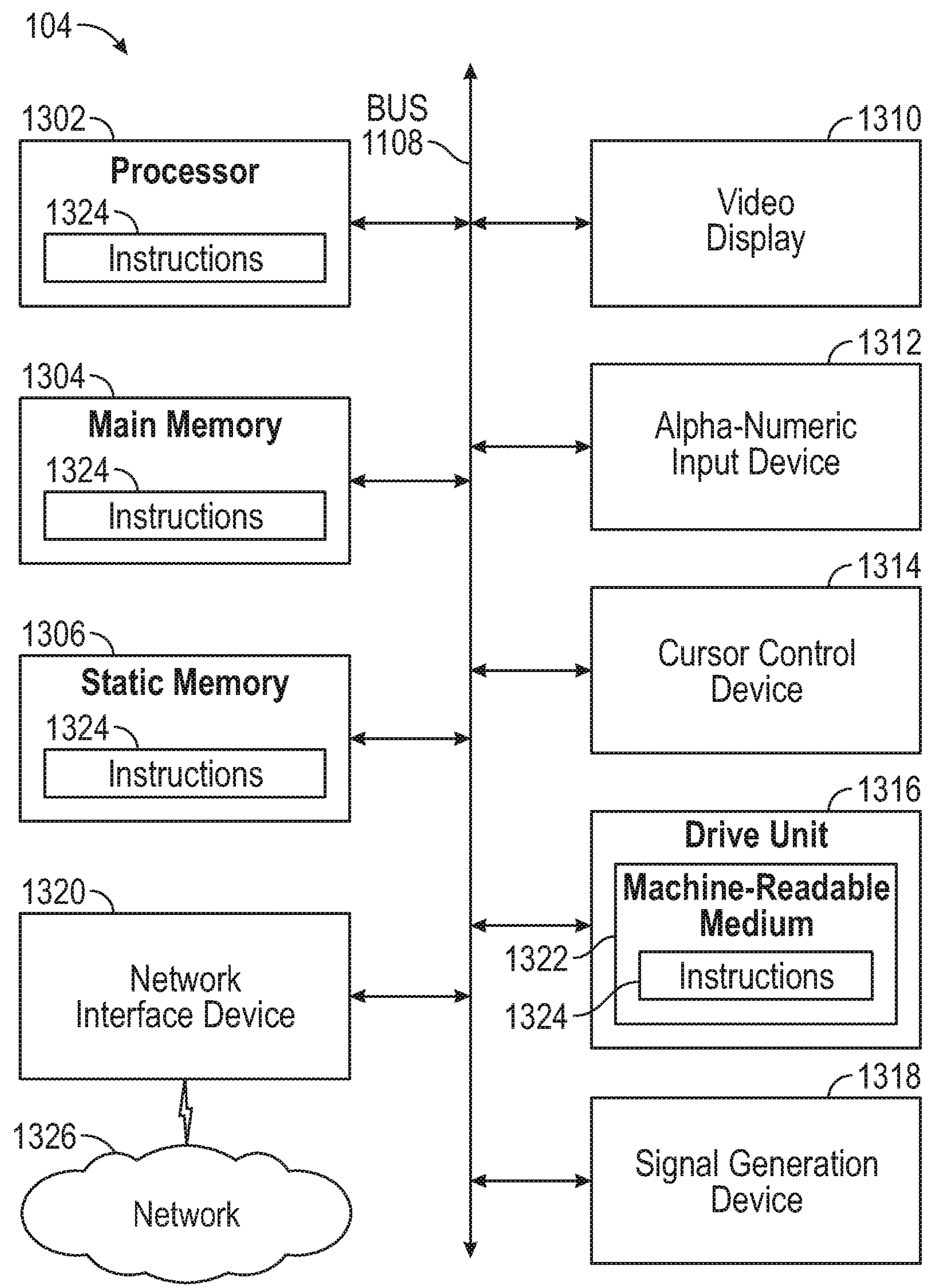
FIG. 13 is an illustrative block diagram of the computer system of FIG. 1 in accordance with some embodiments.

FIG. 13 is an illustrative block diagram of the computer system 104 of FIG. 1 in accordance with some embodiments. The computer system, or variations thereof, may be configured to act as system to classify sounds in accordance with DART. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment, for example. In a networked deployment, the computer may operate in the capacity of a server or a client computer in a server-client network environment, or as a peer computer in a peer-to-peer (or distributed) network environment, for example.

The example computer system 104 includes a hardware processor 1322 (e.g., a central processing unit (CPU), a graphics processing unit (GPU) or both), main memory 134 and static memory 1306, which communicate with each other via bus 1308. The computer system 104 may further include video display unit 1320 (e.g., a plasma display, a liquid crystal display (LCD) or a cathode ray tube (CRT)). The computer system 104 also includes alphanumeric input device 1322 (e.g., a keyboard), a user interface (UI) navigation device 1314 (e.g., a mouse, touch screen, or the like), an SSD or disk drive unit 1316, a signal generation device 1318 (e.g., a speaker), and a network interface device 1320.

The DRAM, SSD or disk drive unit 1326, which can act as a storage memory device, includes computer-readable storage device 1322 on which is stored one or more sets of instructions and data structures (e.g., software 1324) embodying or utilized by any one or more of the methodologies or functions described herein. The software 1324 may also reside, completely or at least partially, within a computer readable storage device such as the main memory 1304 and/or within the processor 1322 during execution thereof by the computer system 104, the main memory 1304 and the processor 1322 also constituting non-transitory computer-readable media. The memory device 304 of FIG. 3 may be implemented within the DRAM, SSD or disk drive unit 1326, for example. The software 1324 may further be transmitted or received over network 1326 via a network interface device 1320 utilizing any one of a number of well-known transfer protocols (e.g., HTTP). The storage memory device 1326 can be configured to store the first simulation models 306, second simulation models 318 and procedures database 324.

Various Examples

Example 1 can include a non-transitory machine-readable medium including instructions stored thereon which, when executed by a machine, configure the machine to perform operations comprising: producing a virtual reality (VR) setting; sensing a hand position in relation to the VR setting; displaying a first VR scene within the VR setting that includes a first VR object corresponding to a first real object at a first real location; displaying a second VR scene within a visual portal in the first VR scene within the VR setting that includes a second VR object corresponding to a second real object at a second real location; displaying a user VR hand image in at least one of the first VR scene and the second VR scene based upon the determined hand position in relation to the VR headset.

Example 2 can include, or can optionally be combined with the subject matter of Example 1, to optionally include the non-transitory machine-readable medium of Example 1 further including: determining at least one of a virtual offset between the VR hand image and the first VR object and a virtual offset between the VR hand image and the second VR object.

Example 3 can include, or can optionally be combined with the subject matter of Example 1, to optionally include identifying an occurrence of an event; and in response to identifying the occurrence of the event, displaying the second VR scene within the visual portal in the first VR scene.

Example 4 can include, or can optionally be combined with the subject matter of Example 1, to optionally include displaying a user VR hand image interaction with the first VR object when user VR hand image is displayed in the first VR scene; and displaying a user VR hand image interaction with the second VR object when user VR hand image is displayed in the second VR scene.

Example 5 can include the non-transitory machine-readable medium to optionally include displaying a control panel image that represents a real control panel and that includes a control panel object image that corresponds to a real control panel object; receiving user input to the display screen to select the control panel object image; in response to the user selection input, displaying a picture-in-picture (PIP) image in the control panel image representing a portion of the real control panel object that is not visible in the control panel image.

Example 6 can include, or can optionally be combined with the subject matter of Example 5, to optionally include providing a control interface at a display screen location of the PIP image.

Example 7 can include, or can optionally be combined with the subject matter of Example 5, to optionally include providing a control interface at a display screen location of the PIP image to receive a user input command; and modifying a portion of the control panel image in response to receiving a user command at the control interface.

Example 8 can include a method comprising: displaying a control panel image that represents a real control panel and that includes a control panel object image that corresponds to a real control panel object; receiving user input to the display screen to select the control panel object image; in response to the user selection input, displaying a picture-in-picture (PIP) image in the control panel image representing a portion of the real control panel object that is not visible in the control panel image.

Example 9 can include, or can optionally be combined with the subject matter of the method of Example 8 further including: providing a control interface at a display screen location of the PIP image.

Example 10 can include, or can optionally be combined with the subject matter of the method of Example 8 further including: providing a control interface at a display screen location of the PIP image to receive a user input command; and modifying a portion of the control panel image in response to receiving a user command at the control interface.

Example 11 can include a non-transitory machine-readable medium including instructions stored thereon which, when executed by a machine, configure the machine to perform operations comprising: displaying a control panel image that represents a real control panel and that includes a control panel object image that corresponds to a real control panel object; receiving user input to the display screen to select the control panel object image; in response to the user selection input, displaying a picture-in-picture (PIP) image in the control panel image representing a portion of the real control panel object that is not visible in the control panel image.

Example 12 can include, or can optionally be combined with the subject matter of Example 11 further including: providing a control interface at a display screen location of the PIP image.

Example 13 can include, or can optionally be combined with the subject matter of Example 11 further including: providing a control interface at a display screen location of the PIP image to receive a user input command; and modifying a portion of the control panel image in response to receiving a user command at the control interface.

Example 14 can include a method comprising: displaying a control panel image that represents a real control panel and that includes a plurality of control panel object images that correspond to a real control panel objects; displaying a plurality of navigation objects each navigation object corresponding to a different control panel object image and at least partially overlaying its corresponding different control panel object image; receiving user input to the display screen to select a navigation object; in response to the user input, modifying a display of a control panel object image that corresponds to the selected navigation object.

Example 15 can include, or can optionally be combined with the subject matter of the method of Example 14 further including: in response to the user input, providing a control interface at a display screen location of a control panel object image corresponding to the selected navigation object.

Example 16 can include a non-transitory machine-readable medium including instructions stored thereon which, when executed by a machine, configure the machine to perform operations comprising: displaying a control panel image that represents a real control panel and that includes a plurality of control panel object images that correspond to a real control panel objects; displaying a plurality of navigation objects each navigation object corresponding to a different control panel object image and at least partially overlaying its corresponding different control panel object image; receiving user input to the display screen to select a navigation object; in response to the user input, modifying a display of a control panel object image that corresponds to the selected navigation object.

Example 17 can include, or can optionally be combined with the subject matter of Example 16 further including: in response to the user input, providing a control interface at a display screen location of a control panel object image corresponding to the selected navigation object.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the claims, along with the full range of equivalents to which such claims are entitled.

We claim:

1. A virtual training system comprising:

a computing processor;

an VR headset to produce a virtual reality (VR) image within a VR setting;

a sensor to determine a hand position in relation to the VR headset;

wherein the processor is configured to perform a method, the method comprising:

displaying a first VR scene within the VR setting that includes a first VR object corresponding to a first real object at a first real location;

displaying a second VR scene within a visual portal in the first VR scene within the VR setting that includes a second VR object corresponding to a second real object at a second real location;

displaying a user VR hand image in at least one of the first VR scene and the second VR scene based upon the determined hand position in relation to the VR headset.

2. The virtual training system of claim 1 further including:

determining at least one of a virtual offset between the VR hand image and the first VR object and a virtual offset between the VR hand image and the second VR object.

3. The virtual training system of claim 1, wherein the processor is configured to perform the method, the method further comprising:

identifying an occurrence of an event; and in response to identifying the occurrence of the event, displaying the second VR scene within the visual portal in the first VR scene.

4. The virtual training system of claim 1, wherein displaying the first VR scene within the VR setting includes displaying the first VR object in relation to a virtual position of the VR headset; and wherein displaying the second VR scene within the visual portal in the first VR scene within the VR setting includes displaying the second VR object in relation to a virtual position of a virtual scene camera.

5. The virtual training system of claim 1,
wherein the processor is configured to perform the method, the method further comprising:
displaying a user VR hand image interaction with the first VR object when user VR hand image is displayed in the first VR scene; and
displaying a user VR hand image interaction with the second VR object when user VR hand image is displayed in the second VR scene.

6. A virtual training method comprising:
displaying a first VR scene within the VR setting that includes a first VR object corresponding to a first real object at a first real location;
displaying a second VR scene within a visual portal in the first VR scene within the VR setting that includes a second VR object corresponding to a second real object at a second real location; and
displaying a user VR hand image in at least one of the first VR scene and the second VR scene based upon the determined hand position in relation to the VR headset.

7. The training method of claim 6 further including:
determining at least one of a virtual offset between the VR hand image and the first VR object and a virtual offset between the VR hand image and the second VR object.

8. The training method of claim 6 further including:
identifying an occurrence of an event; and
in response to identifying the occurrence of the event, displaying the second VR scene within the visual portal in the first VR scene.

9. The training method of claim 6 further including:
displaying a user VR hand image interaction with the first VR object when user VR hand image is displayed in the first VR scene; and
displaying a user VR hand image interaction with the second VR object when user VR hand image is displayed in the second VR scene.

10. A virtual training system comprising:
a computing processor;
a display screen;
wherein the processor is configured perform a method, the method comprising:
displaying a control panel image that represents a real control panel and that includes a control panel object image that corresponds to a real control panel object;
receiving user input to the display screen to select the control panel object image;
in response to the user selection input, displaying a picture-in-picture (PIP) image in the control panel image representing a portion of the real control panel object that is not visible in the control panel image.

11. The virtual training system of claim 10,
wherein the processor is configured to perform the method, the method further comprising:
providing a control interface at a display screen location of the PIP image.

12. The virtual training system of claim 10,
wherein the processor is configured to perform the method, the method further comprising:
providing a control interface at a display screen location of the PIP image to receive a user input command; and
modifying a portion of the control panel image in response to receiving a user command at the control interface.

13. A training method comprising:
producing a virtual reality (VR) setting;
sensing a hand position in relation to the VR setting;
displaying a first VR scene within the VR setting that includes a first VR object corresponding to a first real object at a first real location;
displaying a second VR scene within a visual portal in the first VR scene within the VR setting that includes a second VR object corresponding to a second real object at a second real location;
displaying a user VR hand image in at least one of the first VR scene and the second VR scene based upon the determined hand position in relation to the VR headset.

* * * * *